United States Patent [19]

Valev

[11] Patent Number: 4,834,041
[45] Date of Patent: May 30, 1989

[54] RECIPROCATING INTERNAL COMBUSTION ENGINE AND SUPPORT ASSEMBLY

[75] Inventor: Assen Valev, Perchtoldsdorf, Austria

[73] Assignee: Steyr-Daimler-Puch Aktiengesellschaft, Vienna, Austria

[21] Appl. No.: 256,317

[22] Filed: Oct. 11, 1988

[30] Foreign Application Priority Data

Nov. 3, 1987 [AT] Austria ................. 2885/87

[51] Int. Cl.⁴ ............................................. F16D 3/58
[52] U.S. Cl. ............................ 123/198 E; 123/192 R; 464/93
[58] Field of Search .............. 123/198 E, 192 R; 464/92, 93

[56] References Cited

U.S. PATENT DOCUMENTS

| | | | |
|---|---|---|---|
| 1,984,578 | 12/1934 | Griswold | 464/93 X |
| 2,753,702 | 7/1956 | Dunn | 464/93 |
| 3,406,536 | 10/1968 | Domer | 464/93 |
| 3,478,539 | 11/1969 | Daur | 464/93 X |
| 3,543,538 | 12/1970 | Farrell et al. | 464/93 |
| 3,910,068 | 10/1975 | O'Connor | 464/93 |
| 4,071,008 | 1/1978 | Skatsche et al. | 123/198 E |
| 4,114,472 | 9/1978 | Hornig et al. | 464/93 X |
| 4,428,338 | 1/1984 | Skatsche et al. | 123/198 E |
| 4,480,608 | 11/1984 | Valev | 123/198 E X |
| 4,702,722 | 10/1987 | Narue et al. | 464/93 |

FOREIGN PATENT DOCUMENTS 2113357 10/1971 Fed. Rep. of Germany ........ 464/93
2098908 12/1982 United Kingdom .

Primary Examiner—Tony M. Argenbright
Assistant Examiner—Eric R. Carlberg
Attorney, Agent, or Firm—Marmorek, Guttman & Rubenstein

[57] ABSTRACT

A reciprocating internal combustion engine which is enclosed by a sound-insulating sheath comprises a crankshaft. A coupling which insulates against structure-borne sound is provided for coupling the crankshaft to an auxiliary drive shaft for driving auxiliary devices disposed outside said sheath. Said coupling comprises a resilient ring and axially parallel connecting screws, which are peripherally spaced apart and are secured in alternation to the crankshaft and to the drive shaft and extend through tubular spacers mounted in the ring. The drive shaft is rotatably mounted in a mounting plate, which is fixed to a crossbeam. The internal combustion engine is supported on the crossbeam by an annular member which insulates against structure-borne sound. In order to reduce the radial excursions of the resilient ring to a permissible extent, the resilient ring is disposed between and radially restrained by two restraining plates, one of said restraining plates in non-rotatably connected to the crankshaft by those of the connecting screws which are secured to the crankshaft, the other of said plates is non-rotatably connected to the drive shaft by those of the connecting screws which are fixed to the auxiliary drive shaft, and at least one of said restraining plates is rigid with a cylinder, which coaxially extends into the resilient ring as a press fit.

4 Claims, 2 Drawing Sheets

4,834,041

RECIPROCATING INTERNAL COMBUSTION ENGINE AND SUPPORT ASSEMBLY

BACKGROUND OF THE INVENTION

1. Field of the Invention

This invention relates to a reciprocating internal combustion engine and support assembly and more particularly relates to the means by which a crankshaft of an internal combustion engine that is enclosed by a sound-insulating sheath is coupled to an auxiliary drive shaft, which is coaxial to the crankshaft and serves to drive auxiliary devices, which are associated with the engine and may consist, e.g., of a generator, a water pump or a fan. In such assembly, a coupling which insulates against structure-borne sound is interconnected between the crankshaft and the drive shaft and comprises a resilient ring and axially parallel connecting screw, which are peripherally spaced apart and are secured in alternation to the crankshaft and to the drive shaft and extend through tubular spacers mounted in the ring. The drive shaft is rotatably mounted in a mounting plate, which is fixed to a crossbeam. The internal combustion engine is supported on the crossbeam by an annular member which insulates against structure-borne sound.

2. Description of the Prior Art

An assembly comprising such connecting means is known from U.S. Pat. No. 4,480,608. The resilient ring of the coupling is coupled to the auxiliary drive shaft only by the associated screws and is capable of a radial excursion on the inside and outside. The annular element which insulates against structure-borne sound and supports the internal combustion engine on the crossbeam has a considerable thickness. It has now been found that the connecting means of that type will impart in operation to the resilient ring of the coupling excessively large radial excursions, which will result in a premature destruction of said ring. In order to reduce the extent of said radial excursions, the thickness of the annular element which insulates against structure-borne sound has considerably been reduced although this will decrease the damping of the structure-borne sound that is transmitted from the internal combustion engine to the crossbeam and to the mounting plate. Besides, it has not been possible to reduce the radial excursions of the resilient ring to an entirely satisfactory extent.

SUMMARY OF THE INVENTION

It is an object of the invention to eliminate these disadvantages and so to improve the connecting means described hereinbefore that the radial excursions of the resilient ring of the coupling will be decreased to a satisfactory extent whereas the annular element for insulating against structure-borne sound has a sufficiently large thickness so that it will effect a satisfactory insulation against a transmission of structure-borne sound from the engine to the crossbeam.

That object is accomplished in accordance with the invention in that the resilient ring is disposed between and radially restrained by two restraining plates, one of said restraining plates is non-rotatably connected to the crankshaft by those of the connecting screws which are secured to the crankshaft, the other of said plates is non-rotatably connected to the drive shaft by those of the connecting screws which are fixed to the auxiliary drive shaft, and at least one of said restraining plates is rigid with a cylinder, which coaxially extends into the resilient ring as a press fit.

The two restraining plates ensure that the screws which act in alternation will be fixed more reliably. An essential improvement is constituted by the cylinder, which coaxially extends into the resilient ring as a press fit and substantially prevents radial excursions of said ring. As a result, the thickness of the annular element which insulates against structure-borne sound need no longer be reduced in order to minimize said radial excursions. The member that extends into the resilient ring as a press fit need not consist of a circular cylinder but may alternatively have a prismatic shape. But a cylinder can be manufactured much more easily. Instead of only one cylinder, which protrudes from one of the plates into the ring, two cylinders may be provided, each of which is secured to one of the plates. In that case each of said cylinders will extend into the resilient ring approximately to one-half of the thickness of such ring.

It will usually be required to provide for a certain permissible raidal exursion of the resilient ring. In such case, clearance will be provided between the coaxial cylinder and the resilient ring adjacent to those connecting screws which are held in that restraining plate that is not provided with the cylinder.

DETAILED DESCRIPTION OF THE PREFERRED EMBODIMENT

Figure 1:
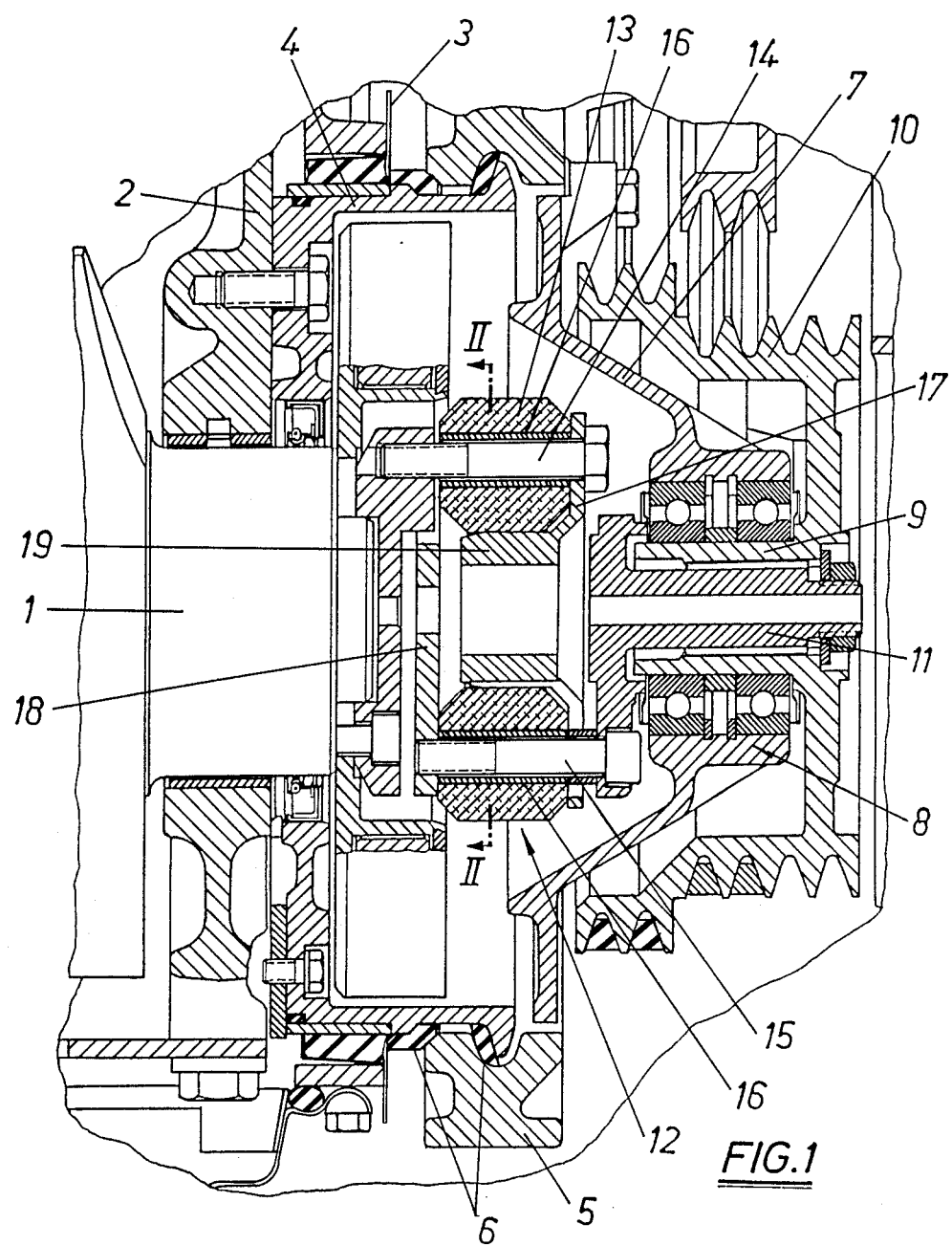
FIG. 1 is an axial sectional view showing the means by which the crankshaft is connected to the coaxial auxiliary drive shaft.

An illustrative embodiment of the invention will now be explained in more detail with reference to the drawing.

The internal combustion engine is represented in the drawing only by a part of the crankshaft 1 and of the engine block 2. The internal combustion engine is enclosed on all sides by a sound-insulating sheath 3. The engine block 2 is connected to a drum 4 and by said drum is supported on a crossbeam 5. An annular element 6 which insulates against structure-borne sound is interposed between the crossbeam 5 and the drum 4. A covering mounting plate 7 which is coaxial to the crankshaft 1 is screw-connected to the crossbeam 5 and is provided with a bearing 8 for the shaft 9 of a disk 10, which serves to drive auxiliary devices, which are not shown and may consist, e.g., of a generator, a water pump and a fan. The shaft 9 or a shaft section 11 that is non-rotatably connected to the shaft 9 is connected to the crankshaft 1 by a flexible coupling 12, which insulates against structure-borne sound. That coupling 12 comprises a resilient ring 13 and peripherally spaced apart screws 14, 15, which extend in tubular spacers 16 through said ring 13 and are secured in alternation to the crankshaft 1 and to the auxiliary drive shaft 9, 11. Specifically, a plurality of first screws 14 are fixed to the crankshaft 1 and a plurality of second scres 15 are fixed to auxiliary drive shaft 9, 11. The first and second screws 14 and 15 are arranged in alternation.

Figure 2:
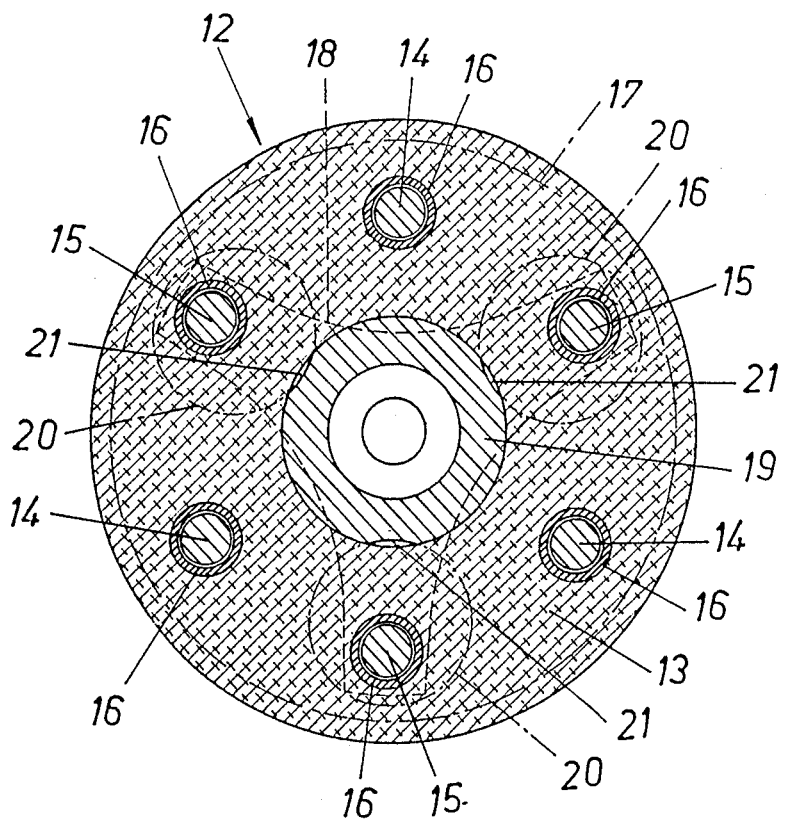
FIG. 2 is a transverse sectional view taken on line II—II in FIG. 1.

The resilient ring 13 is disposed between and axially prestressed and radially restrained by two restraining plates 17, 18. The restraining plate 17 is non-rotatably connected by the screws 14 to the crankshaft 1 and the restraining plate 18 is non-rotatably connected to the drive shaft 9, 11 by the screws 15. The restraining plate 17 is rigid with a cylinder 19, which coaxially extends into the resilient ring as a press fit. It will be understood that the restraining plate 17 is formed with cylindrical holes 20 (FIG. 2), which define clearance around the screws 15. The restraining plate 18 comprises three radial arms, which radiate from a central hub portion. It is also apparent from FIG. 2 that the cylinder 19 defines clearances with the resilient ring 13 adjacent to the screws 15.

I claim:

1. In a reciprocating internal combustion engine and support assembly comprising
    a crossbeam,
    an annular element which insulates against structure-borne sound,
    a reciprocating internal combustion engine which includes a crankshaft and is supported on said crossbeam by means of said annular element,
    a sound-insulating sheath enclosing said engine,
    a mounting plate, which is secured to said crossbeam,
    an auxiliary drive shaft, which is coaxial to said crankshaft and rotatably mounted in said mounting plate, and
    a coupling for non-rotatably connecting said crankshaft to said auxiliary drive shaft, which coupling insulates against structure-borne sound and comprises
    a resilient ring,
    a plurality of peripherally spaced apart, axially parallel spacers extending in said ring,
    a plurality of first screws extending through respective ones of said spacers and rigidly connected to said crankshaft, and
    a plurality of second screws extending through respective ones of said spacers and arranged in alternation with said fist screws and rigidly connected to said auxiliary drive shaft,
    the improvement residing in that
    first and second restraining plates are disposed on opposite sides of and bear on said ring and radially restrain said ring,
    said first restraining plate is non-rotatably connected by said first screws to said crankshaft,
    said second restraining plate is non-rotatably connected by said second screws to said auxiliary drive shaft, and
    at least one of said restraining plates it rigid with a cylinder, which coaxially extends into said resilient ring as a press fit.

2. The improvement set forth in claim 1, wherein said resilient ring is axially prestressed between said restraining plates.

3. The improvement set forth in claim 1 as applied to an assembly wherein
    said crossbeam is adapted to carry auxiliary devices disposed outside said sheath and
    said auxiliary drive shaft is adapted to be coupled to said auxiliary devices to drive the same.

4. The improvement set forth in claim 1, wherein
    said resilient ring defines clearances with said cylinder adjacent to those of said screws which extend through that of said restraining plates which is not connected to said cylinder.

* * * * *